June 6, 1967   E. H. DAVISON   3,324,388
METEOROID SENSING APPARATUS HAVING A COINCIDENCE NETWORK
CONNECTED TO A PAIR OF CAPACITORS
Filed Jan. 4, 1963
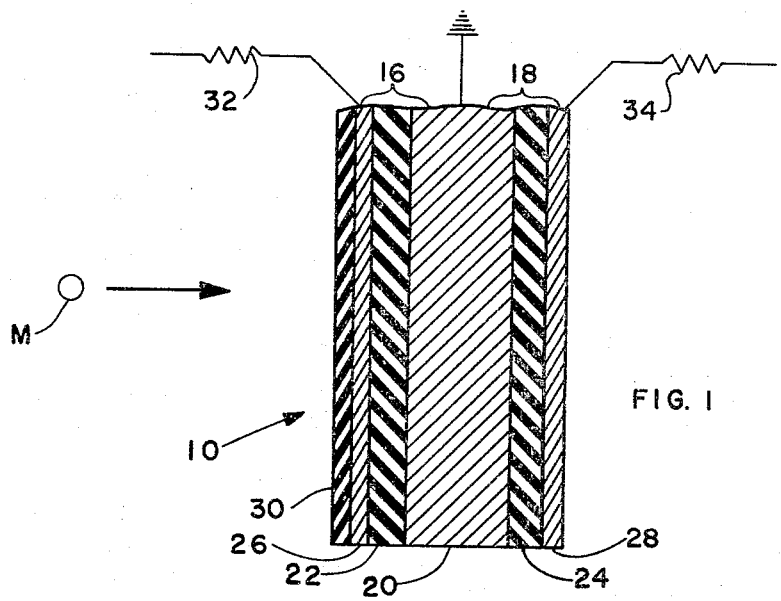
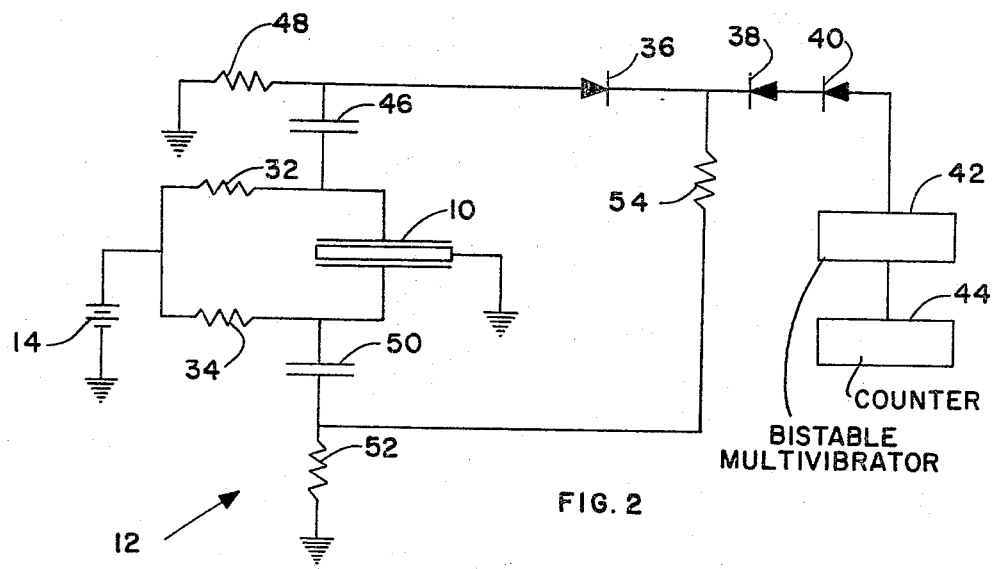
INVENTOR
ELMER H. DAVISON
BY
ATTORNEYS

United States Patent Office 3,324,388
Patented June 6, 1967

3,324,388
METEOROID SENSING APPARATUS HAVING A COINCIDENCE NETWORK CONNECTED TO A PAIR OF CAPACITORS
Elmer H. Davison, North Olmsted, Ohio, assignor to the United States of America as represented by the Administrator of the National Aeronautics and Space Administration
Filed Jan. 4, 1963, Ser. No. 249,537
4 Claims. (Cl. 324—61)

The invention described herein may be manufactured and used by or for the Government of the United States of America for governmental purposes without the payment of any royalties thereon or therefor.

This invention relates to apparatus for determining meteoroid penetration of space vehicles, and more particularly, to an improved sensor for making direct measurements of meteoroid damage by recording the penetration rates of particles through known metal thicknesses.

Various devices have been proposed for mounting on satellites to determine the presence of meteoroids in outer space; for example, pressure capsules have been used which lose pressure when punctured to activate a switch. Another device utilizes a wire or foil grid which has an electrical continuity that can be disrupted by a particle impacting the grid or penetrating a protective cover over the grid. Such devices have been satisfactory where self-storing ability is of prime importance to enable the sensor to be interrogated at any time. However, these devices have a disadvantage of not being able to record every penetration.

This problem has been solved by the apparatus of the present invention which includes a sensor having a sandwich type construction with a centrally disposed metal sheet of known thickness that is electrically grounded. A layer of dielectric material covers each surface of the metal sheet and a film of metal is deposited on each dielectric layer to form a pair of capacitor assemblies. A coincidence counting technique is employed to determine when a penetration of the sandwich occurs. As a particle passes through the sandwich, each capacitor assembly is discharged in turn. If two voltage pulses arrive at a diode within a given time interval, a pulse is permitted to pass and is counted as a penetration.

It is, therefore, an object of the present invention to provide an improved apparatus for determining the presence of meteoroids in space which combines simplicity of construction with ruggedness.

Another object of the invention is to provide an improved apparatus for determining meteoroid damage in space vehicles which is inexpensive to manufacture and adaptable for use in various space applications.

A further object of the invention is to provide an improved micrometeoroid sensor which counts only the punctures which penetrate the entire sensor.

Other advantages of the invention will be apparent from the specification which follows and from the drawings in which like numerals are used throughout to identify like parts.

In the drawings:

FIG. 1 is a vertical sectional view through a portion of an improved meteoroid sensor constructed in accordance with the invention, and FIG. 2 is a schematic view showing the improved meteoroid sensor and its coincidence counting circuit.

Referring now to the drawings there is shown a sensor panel 10 for ascertaining the presence of micrometeoroids in space and for evaluating the possible damage which might be caused by such objects. The sensor panel 10 is of the capacitor type and is connected to a suitable detecting circuit 12 of the diode logic type as shown in FIG. 2.

The circuit 12 includes a silicon solar cell-battery combination 14 for supplying the desired potential to the sensor 10, and the solar cells are mounted on the surface of an instrumentation package carried by a satellite or other space vehicle.

According to the present invention the sensor 10 comprises a sandwich type construction forming a pair of capacitors 16 and 18 that are charged by the power source 14. The sensor 10 includes a ground plate 20 in the form of a thin metal sheet having a known thickness and layers 22 and 24 of a dielectric material are bonded to opposite surfaces of this metal sheet. These layers 22 and 24 are very thin and preferably comprise sheets of Mylar. However, it is also contemplated that the dielectric layers 22 and 24 may be a vapor deposit of silicon monoxide or other suitable vapor deposited coatings.

Aluminum films 26 and 28 engage the outer surfaces of the dielectric layers 22 and 24 respectively, and these films are vapor deposited. The sensor 10 is temperature controlled by using a thermal control coating 30 comprising a coating of silicon monoxide or other suitable material over the vapor deposit of aluminum 26. This combination of Al plus SiO limits the maximum temperature of the sensor 10 by controlling the ratio of solar absorptivity to low temperature emissivity. Fluctuations from the maximum temperature to much lower temperatures can be tolerated, but it is necessary to limit the maximum temperature.

The resulting sandwich is quite thin, and can be folded or rolled for compactness during the launching of the space vehicle. For example, sensor panels 10 have been successfully tested in which the ground plate 20 has a thickness in the range between approximately 1 and 10 mils while the dielectric layers 22 and 24 are ¼ mil thick Mylar sheets. The aluminum films 26 and 28 are vapor deposited to a thickness of about 1,000 Angstroms. A typical thermal control coating 30 has a thickness in the range between about 1,000 Angstroms to about 10,000 Angstroms, depending upon the maximum temperature requirements.

Because of the extreme thinness of both the aluminum films 26 and 28 as well as the dielectric layers 22 and 24 penetration of the entire sandwich corresponds, in effect, to penetrations of only the metal, and it is possible to apply an effective coincidence counting technique to the sensor 10 because the complete penetration of the entire sandwich occurs in less than a microsecond. Also by using the coincidence circuit arrangement, only those punctures that penetrate the entire thickness of the sensor 10 are recorded, and this arrangement eliminates counts resulting from discharges due to other causes such as the aluminum vapor deposit burnoff when the dielectric is punctured or breakdown of the dielectric because of minor flaws.

A further advantage of this type of construction is that both sides of the metal surface exposed can be effective for measuring penetration if it is so desired. The sensor panel 10 may act as its own structural support which, when both sides are utilized for penetration measurement as in the aforementioned embodiment, reduces the weight per unit area exposed to a minimum.

In operation, the capacitor assemblies 16 and 18 are charged through resistors 32 and 34 respectively by the solar cell power supply 14 in the battery portion of the circuit 12 so that the stainless steel ground plate 20 has a negative charge. In a typical sensor panel 10 in which the various components have the aforementioned thicknesses, the potential of each of the aluminum layers 26 and 28 is raised to approximately 100 volts. The capacitor assemblies 16 and 18 have a capacitance of from 1 to 2 mf.

As a particle, such as a micrometeoroid M shown in FIG. 1, passes through the sensor 10, each capacitor 16 and 18 is discharged in turn, and if two voltage pulses arrive at a diode 36 in the counting circuit 12 in a given time interval, a pulse is permitted to pass through diodes 38 and 40 to a bistable multivibrator 42 whereupon it is recorded on a counter 44. The diodes 36, 38 and 40 are preferably silicon; however, a zener diode may be substituted for the pair of silicon diodes 38 and 40. The multivibrator 42 is capable of operating under space environment conditions and consumes less than 100 microwatts of power.

In the situation where the micrometeoroid M does not pass through the entire sandwich but only discharges the capacitor assembly 16 for example, the resulting discharge of a capacitor 46 sends a pulse along the circuit 12 through a resistor 48 which is not passed by diode 36. Likewise, if the micrometeoroid M strikes the sensor 10 from the opposite side and discharges only the capacitor assembly 18, the resulting discharge of a capacitor 50 similarly sends a pulse along with the circuit through resistors 52 and 54. Because the resistance of the resistor 54 is much greater than that of the resistors 48 and 52 only a very weak signal reaches the diode 38. This signal is not strong enough to be passed by the diodes 38 and 40 that are in series.

While only one embodiment of the invention has been disclosed and described, various modifications may be made to the disclosed structure without departing from the spirit of the invention or the scope of the subjoined claims. For example, it is contemplated that the counting circuit 12 may be adapted to count separately the particles that penetrate only one condenser assembly 16 or 18 to obtain added information on much smaller particles than those required for complete penetrations.

What is claimed is:

1. Apparatus for determining the presence of meteoroids comprising,
   a metal sheet having a thickness in the range from 1 to 10 mils between opposed surfaces,
   a one-quarter mil thick layer of dielectric material in contact with each of said opposed surfaces,
   a vaporized aluminum layer having a thickness of about 1,000 Angstrom units on each dielectric layer,
   said aluminum layers and said metal sheet forming with said dielectric layers a pair of capacitors the penetration of which corresponds to the penetration of only said metal sheet,
   means for charging said pair of capacitors, each of said capacitors being discharged when penetrated by a meteoroid whereby a pair of electrical pulses is generated by the passage of a meteoroid through said metal sheet,
   a coincidence network electrically connected to said pair of capacitors for receiving said pair of pulses, and
   recording means connected to said network for receiving a single pulse therefrom generated by said pair of pulses arriving thereat within a predetermined short time interval.

2. Apparatus for determining the presence of meteoroids as clamed in claim 1 including
   a thermal control coating covering the vaporized aluminum layer to limit the maximum temperature of the capacitors by controlling the ratio of solar absorptivity to low temperature emissivity.

3. Apparatus for determining meteoroid damage to space vehicles, said apparatus comprising,
   a pair of capacitors positioned on the space vehicle in close proximity with one another,
   means for charging said pair of capacitors,
   each of said capacitors being discharged by the penetration thereof by a meteoroid whereby an electrical pulse is generated,
   a coincidence network electrically connected to each of said capacitors for receiving said electrical pulses and generating a single pulse in response to the receipt of a pair of substantially simultaneous electrical pulses generated by the substantially simultaneous discharge of both said capacitors by the penetration thereof by a meteoroid, and
   recording means for counting said single pulses as meteoroid penetrations.

4. Apparatus for determining meteoroid damage comprising,
   a pair of capacitors having a common ground plate positioned to be struck by meteoroids,
   means for charging said pair of capacitors, each of said capacitors being discharged when penetrated by a meteoroid whereby a pair of substantially simultaneous electrical pulses is generated by the passage of said meteoroid through said common ground plate,
   a coincidence network electrically connected to said pair of capacitors for receiving said pair of simultaneous electric pulses and passing the same as a single pulse, and
   recording means connected to said coincidence network for receiving each of said single pulses therefrom and counting the same as a single penetration of said common ground plate.

References Cited

UNITED STATES PATENTS

| | | | |
|---|---|---|---|
| 2,703,857 | 3/1955 | Engelhardt | 317—261 |
| 2,944,250 | 2/1960 | Outt | 73—170 |
| 2,984,745 | 5/1960 | Scherbatskoy | 250—71.5 |
| 3,004,735 | 10/1961 | Kinard | 244—14 |
| 3,004,763 | 10/1961 | Knapp | 273—102.2 |
| 3,159,029 | 12/1964 | Ruderman | 73—170 |
| 3,222,596 | 12/1965 | Meyer et al. | 324—70 |

FOREIGN PATENTS 58,159   8/1946   Netherlands.

WALTER L. CARLSON, *Primary Examiner.*

W. H. BUCKLER, E. E. KUBASIEWICZ,
*Assistant Examiners.*